United States Patent [19]

Drobnik et al.

[11] 4,119,561

[45] Oct. 10, 1978

[54] METHOD FOR AVOIDING MALFUNCTIONS IN THE SOLIDIFICATION OF AQUEOUS, RADIOACTIVE WASTES IN A GLASS, GLASS CERAMIC OR GLASS CERAMIC-LIKE MATRIX

[75] Inventors: Stefan Drobnik; Herbert Koschorke, both of Stutensee; Friedrich Kaufmann; Jaroslav Saidl, both of Karlsruhe, all of Fed. Rep. of Germany

[73] Assignee: Gesellschaft für Kernforschung m.b.H., Karlsruhe, Fed. Rep. of Germany

[21] Appl. No.: 778,711

[22] Filed: Mar. 17, 1977

[30] Foreign Application Priority Data

Mar. 20, 1976 [DE] Fed. Rep. of Germany ....... 2611954

[51] Int. Cl.$^2$ ................................................. G21F 9/14
[52] U.S. Cl. ............................................. 252/301.1 W
[58] Field of Search .................... 252/301.1 W; 34/10

[56] References Cited

U.S. PATENT DOCUMENTS 3,008,904  11/1961  Johnson, Jr. et al. ....... 252/301.1 W

OTHER PUBLICATIONS

Krause, H. "Die Verfestigung hochradioactiver Abtalle" Chemie-Ing.-Techn. vol. 45, No. 10a (1973) pp. 658–663.
Chem. Abstracts #70:80711r (1969).
Saidl, J., "Verfestigünghochactiver Spaltprodukte in Glas" Report No. KFK-2126 (May, 1975) pp. 33–38.
"Diatomite" as defined in *The Condensed Chemical Dictionary*, 6th Edition, 1961 p. 353.

*Primary Examiner*—Benjamin R. Padgett
*Assistant Examiner*—Deborah L. Kyle
*Attorney, Agent, or Firm*—Spencer & Kaye

[57] ABSTRACT

Method for preventing malfunctions in the solidification of radioactive wastes contained in an aqueous waste solution in a glass, glass ceramic or glass ceramic-like matrix wherein the wastes are spray-dried and calcinated. Diatomaceous earth or diatomaceous earth-like substances in solid form are added to the aqueous waste solution before the spray drying step in quantities of 45g/l to 70g/l and in grain sizes of which more than 85 percent by weight of the grain size distribution are grain sizes from 6 to 75$\mu$.

4 Claims, No Drawings

METHOD FOR AVOIDING MALFUNCTIONS IN THE SOLIDIFICATION OF AQUEOUS, RADIOACTIVE WASTES IN A GLASS, GLASS CERAMIC OR GLASS CERAMIC-LIKE MATRIX

BACKGROUND OF THE INVENTION

The present invention relates to a method for avoiding malfunctions in the solidification of aqueous, radioactive wastes in a glass, glass ceramic or glass ceramic-like matrix in which the wastes are spray-dried and calcinated.

In known processes for the solidification of aqueous, highly radioactive wastes in a glass matrix or in a glass ceramic matrix or a glass ceramic-like matrix, the waste waters generally are first denitrated and the denitrated waste waters, for example, are spray-dried and calcinated in a spray calcinator which contains a spray nozzle. Waste gases are formed during the spray drying and calcination process and are sent to a waste gas filtering system comprised of filter candles or cartridges. The calcinate resulting from this spray drying and calcination process can then be mixed in solid form with glass former substances or with a ground, previously-produced glass frit of a certain composition and can then be melted in a crucible or furnace to form a homogeneous mass. Alternatively, the glass formers or glass frits, respectively, are added to the waste water before the spray drying process. In this case, in order to obtain a good and uniform mixture, of the components being spray dried and calcinated, until the calcinate enter the melting crucible, the additive Aerosil has been added to the waste solution before the spray drying. Aerosil is a particularly pure and finely-dispersed silicic acid which forms colloidal suspensions in aqueous solutions. This method is reported by J. Saidl in an article entitled "Verfestigung hochaktiver Spaltprodukte in Glas" (in translation, Solidification of Highly Active Fission Products in Glass), which appears at pages 33 to 38 of "Jahresbericht 1973, Abteilung Dekontaminationsbetriebe; Bericht der Gesellschaft fur Kernforschung mbH" (in translation, Annual Report for 1973 - Department of Decontamination Operations; Report of the Gesellschaft fur Kernforschung mbH), No. KFK-2126 (May, 1975).

It has now been found, however, that with such a mode of operation, namely, first calcinating and then mixing the calcinate with the glass forming substances or with the previously-produced glass frit, the spray nozzle in the spray calcinator becomes clogged as the time of operation progresses and/or the filter units in the waste gas filtering system grow shut and unavoidable deposits occur in increasing quantities in the calcinator. In the alternative case, when the Aerosil is stirred into the waste solution, its poor miscibility produces difficulties with regard to the fact that, with greater throughputs of waste solution to the spray calcinator, the required good mixing can be attained only after longer periods of dwell. Moreover, in spite of the fact that Aerosil is composed of superfine grains, demixing of the Aerosil can be noted during transporting of the metering quantity of the aqueous waste feeder solution toward the spray nozzle which may again lead to clogging.

SUMMARY OF THE INVENTION

It is an object of the present invention to avoid the drawbacks of the known processes and to provide a method with which, after the step of calcinating, a well tricklable (free flowing) calcinate is obtained which can easily be mixed with the granular glass frit or the glass former substances.

A further object of the present invention is to provide such a method which can accommodate greater throughput quantities, for example, about 150 l of waste solution per hour, without clogging of the spray nozzle etc., which could interfere with the smooth operation and reduce the throughput.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a method for preventing malfunctions in the solidification of radioactive wastes contained in an aqueous waste solution in a glass, glass ceramic or glass ceramic-like matrix wherein the waste solution is spray-dried and calcinated, comprising, adding to the aqueous waste solution, before the spray drying, diatomaceous earth or diatomaceous earth-like substances in solid form in quantities of 45g/l to 70g/l and in grain sizes of which more than 85 percent by weight of the grain size distribution are grain sizes from 6 to 75µ.

Preferably, the diatomaceous earth which is added has a composition of about 90 percent by weight $SiO_2$; 4 percent by weight $Al_2O_3$; 3.3 percent by weight $Na_2O$ + $K_2O$; 1.3 percent by weight $Fe_2O_3$; the remainder the sum of $MgO$ + $CaO$ + $TiO$ + $P_2O_5$; and a grain size distribution in which more than 70 percent by weight of the grains are between 10 and 40µ.

It has been found that the most favorable range for the addition of diatomaceous earth or of diatomaceous earth-like substances to the aqueous waste solution is an addition in quantities of 50g/l to 60g/l.

It is to be understood that both the foregoing general description and the following detailed description are exemplary, but are not restrictive of the invention.

DETAILED DESCRIPTION OF THE INVENTION

The aqeuous waste solutions which are treated in the practice of the present invention are radioactive waste solutions which are produced, for example, from nuclear plants. A typical aqueous radioactive waste solution which can be treated is a highly radioactive aqueous waste solution (HAW) which is obtained during reprocessing of irradiated nuclear fuel and/or breeder materials after the common extraction of uranium and plutonium in the first extraction cycle of an extraction cycle. These solutions generally contain nitric acid and generally are denitrated before being spray-dried and calcinated.

In accordance with the present invention, diatomaceous earth or diatomaceous earth-like substances in solid form are added to the aqueous waste solution before the spray drying step in quantities of from 45 to 70 grams per liter of aqueous waste solution, and preferably 50 to 60g/l. The diatomaceous earth or diatomaceous earth-like substances which are added have grain sizes of which more than 85 percent by weight of the grain size distribution are grain sizes from 6 to 75µ.

Preferably, more than 70 percent by weight of the grains have grain sizes between 10 and 40μ.

After addition of the diatomaceous earth or diatomaceous earth-like substances, the aqueous waste solution is spray-dried and calcinated.

The method according to the invention is an improvement over the known solidification processes for highly radioactive aqueous waste solutions in more than one respect. For example, an increased sorption of melted salts, such as, for example, $RbNO_3$, $CsNO_3$, $NaNO_3$, was noted at the diatomaceous earth during the calcination step as compared to other types of additives which were added to the waste solutions for comparison purposes and which were examined as to their effectiveness. Further, the calcinate formed by the present invention has good trickling properties so that it can flow freely from the spray calcinator into a melting crucible or vessel disposed beneath the spray calcinator. In addition, the aqueous waste solution which contains the diatomaceous earth or diatomaceous earth-like substances have very good transporting properties so that it can be easily transported to the spray nozzle without demixing.

The calcinate formed by the present invention exhibits a particularly favorable behavior at the waste gas filter candles. The method of the present invention results in longer intervals between the need for blow-back of the filter candles in order to clean them and this again results in longer lifetimes for the filters. Moreover, the waste solution can be fed into the spray calcinator in higher concentrates.

The expression of numerical values of the improvements mentioned could not be simply done because of lack on the quantitative comparisons, i.e. the sorption of melted salts on smooth compact surfaces are much more lower compared with the surface of kieselgur. Nevertheless a quantitative expresion varies in broad limits from one salt to another.

As "diatomaceous earth" it should be understood natural matter as kieselgur, diatomaceous earth-like substances, kieselgur-similar or kieselgur-like material with high content of $SiO_2$ and similar all over sorption properties as kieselgur itself.

The present invention will be explained in the example that follows without, however, being limited thereto.

EXAMPLE

A simulated waste solution, which in its chemical composition corresponds approximately to a highly radioactive waste solution concentrate from a reprocessing system for irradiated nuclear fuels, was produced according to the following weighed quantities:

| | |
|---|---|
| NaNO. | 22.55 g/l |
| Fe(NO).. 9 H.O | 36.18 g/l |
| Ca(NO.).. 4 H.O | 30.17 g/l |
| (NH.).Mo-O... 4 H.O | 9.14 g/l |
| Mn(NO ).. 6 H.O | 3.60 g/l |

-continued

| | |
|---|---|
| Co(NO.).. 6 H.O | 1.79 g/l |
| Ni(NO.).. 6 H.O | 3.70 g/l |
| Sn(NO.). | 0.15 g/l |
| TeO. | 0.82 g/l |
| Pb(NO.). | 1.72 g/l |
| Cr(NO.).. 9 H.O | 6.94 g/l |
| ZrO. | 7.95 g/l |

Two aliquots were taken from this simulated waste solution. At room temperature, 52.5g/l Aerosil were added to the first aliquot under stirring or pulsating. Similarly, 58.7g/l diatomaceous earth were added to the second aliquot at room temperature under stirring or pulsating. The mixing process was continued for a few minutes after completion of the addition process. Thereafter, the two aliquots were separately transported to a spray nozzle and were atomized, dried and calcinated with the aid of atomizing vapor at about 450° C.

The first aliquot to which Aerosil had been added produced larger, adhering deposits at the spray nozzle and the waste gas filter candles than the second aliquot which contained diatomaceous earth in accordance with the present invention. A well tricklable (free flowing) calcinate was obtained from the second aliquot containing diatomaceous earth and it fell into the melting crucible disposed below the spray nozzle. When working with the second aliquot, a small portion of the calcinate was retained at the filter candles and this could easily and completely be removed from the filter candles by a blow-back.

It will be understood that the above description of the present invention is susceptible to various modifications, changes and adaptations, and the same are intended to be comprehended within the meaning and range of equivalents of the appended claims.

What is claimed is:

1. Method for preventing malfunctions in the solidification of radioactive wastes contained in an aqueous waste solution in a glass, glass ceramic or glass ceramic-like matrix, wherein the waste solution is spray-dried and calcinated, comprising adding to the aqueous waste solution, before the spray drying, diatomaceous earth in solid form in quantities of from 45g/l to 70g/l and in grain sizes of which more than 85 percent by weight of the grain size distribution are grain sizes from 6 to 75μ.

2. Method as defined in claim 1, wherein diatomaceous earth is added to the aqueous waste solution in quantities of from 50g/l to 60g/l 3. Method as defined in claim 1, wherein diatomaceous earth is added which has a composition of about 90 percent by weight $SiO_2$; 4 percent by weight $Al_2O_3$; 3.3 percent by weight $Na_2O + K_2O$; 1.3 percent by weight $Fe_2O_3$; and the remainder the sum of MgO + CaO + TiO + $P_2O_5$, and a grain size distribution in which more than 70 percent by weight of the grains are between 10 and 40μ.

4. Method as defined in claim 3, wherein diatomaceous earth is added to the aqueous waste solution in quantities of from 50g/l to 60g/l.

* * * * *